US005360682A

United States Patent [19]
Bohmer

[11] Patent Number: 5,360,682
[45] Date of Patent: * Nov. 1, 1994

[54] BATTERY CHARGE INDICATOR APPARATUS AND THE METHOD OF OPERATION THEREOF

[75] Inventor: William Bohmer, Succasunna, N.J.

[73] Assignee: Display Matrix Corporation, Randolph, N.J.

[ * ] Notice: The portion of the term of this patent subsequent to Sep. 14, 2010 has been disclaimed.

[21] Appl. No.: 931,830

[22] Filed: Aug. 17, 1992

[51] Int. Cl.$^5$ .......................................... H01M 10/48
[52] U.S. Cl. ........................................ 429/91; 429/70
[58] Field of Search .................... 429/60, 70, 90, 91

[56] References Cited

U.S. PATENT DOCUMENTS

| | | | |
|---|---|---|---|
| 3,218,858 | 11/1965 | Van Woert | 429/91 X |
| 3,563,806 | 2/1971 | Hruden | 429/91 X |
| 4,129,686 | 12/1978 | Kaduboski | 429/66 X |
| 4,203,065 | 5/1980 | Whitford | 429/90 X |
| 4,992,344 | 2/1991 | Coppers | 429/66 X |

Primary Examiner—Stephen Kalafut
Attorney, Agent, or Firm—John Q. McQuillan

[57] ABSTRACT

A battery charge indicator is disclosed which is permanently incorporated into a battery to indicate the state of charge. The indicator includes a compressible chamber such as a blister which is adapted to be installed in a battery as an assembly. The blister chamber is filled with a viscous gel and is exposed to the expandable cathode of the battery. As the battery discharges, the cathode expands thus causing the gel within the chamber to be extruded out through an outlet into a viewing channel in an overlying disk. The amount of gel flowing into the viewing channel is proportional to the amount of expansion of the cathode and, thus, indicates the amount of discharge and, conversely, the remaining life of the battery. A battery charge indicator is also disclosed in which the expansion of the cathode is adapted to apply localized pressure to a disk. The localized pressure applied to the disk causes stretching of the material of the disk, which causes a visual indication of the state of charge of the battery.

57 Claims, 14 Drawing Sheets

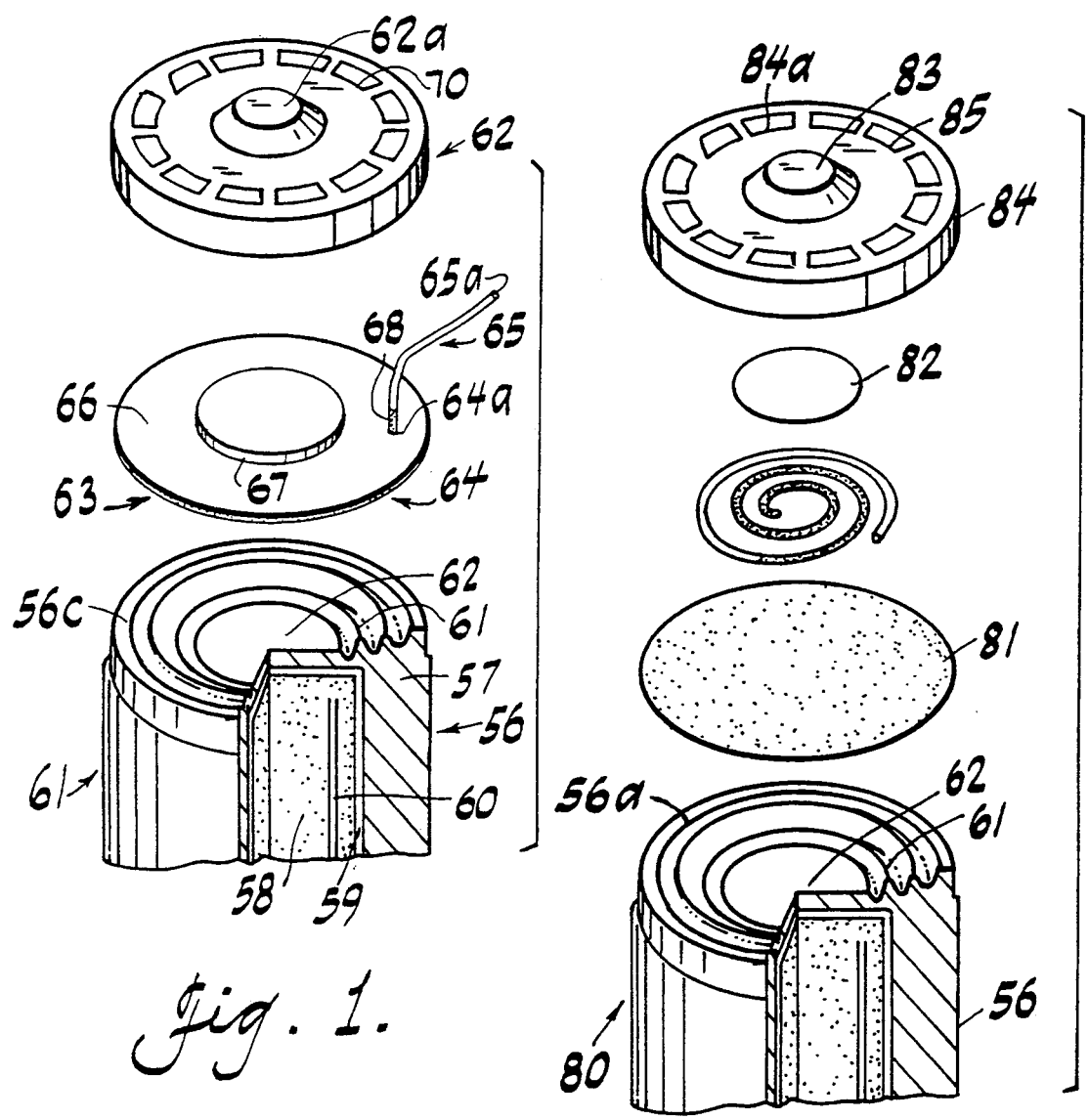

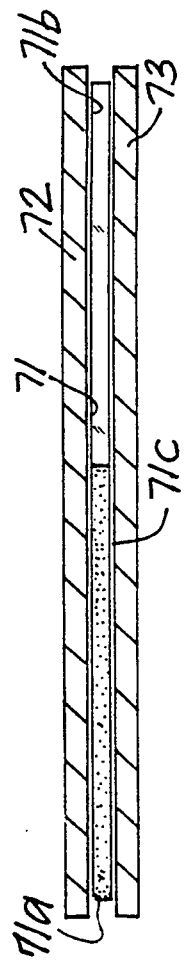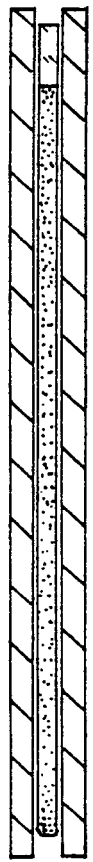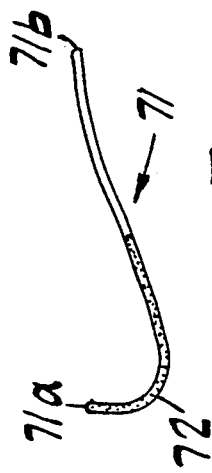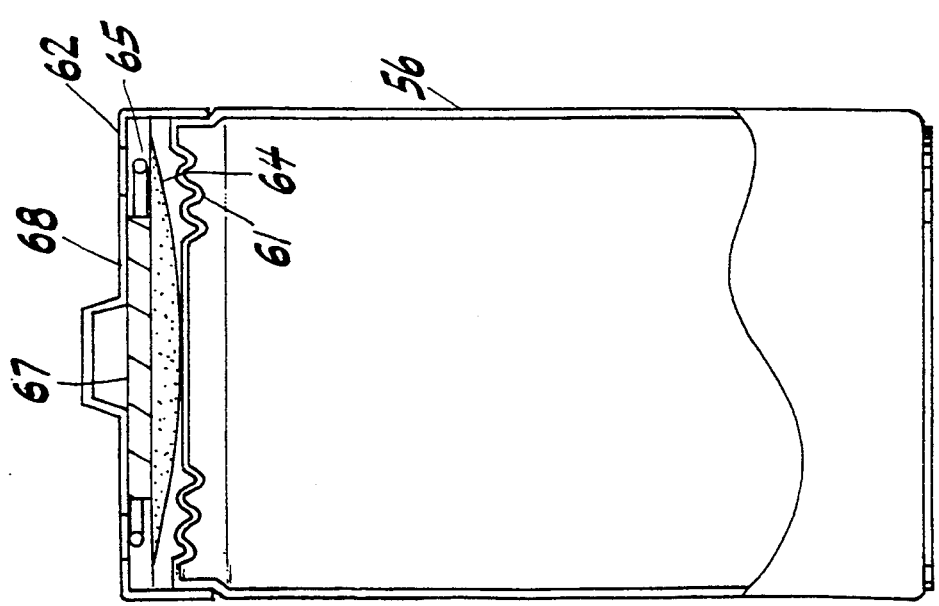

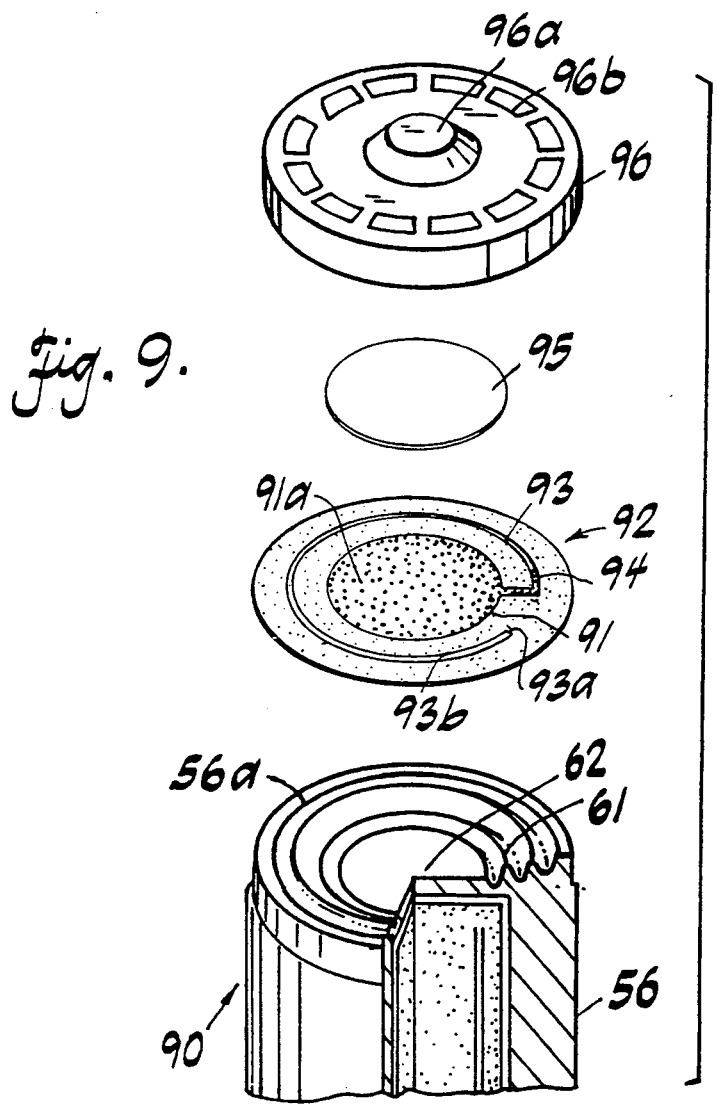

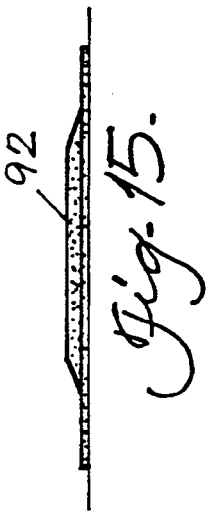
Fig. 15.
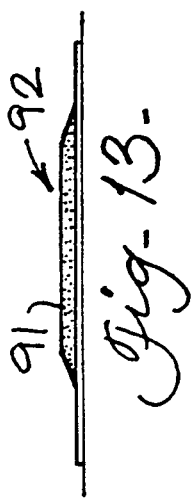
Fig. 13.
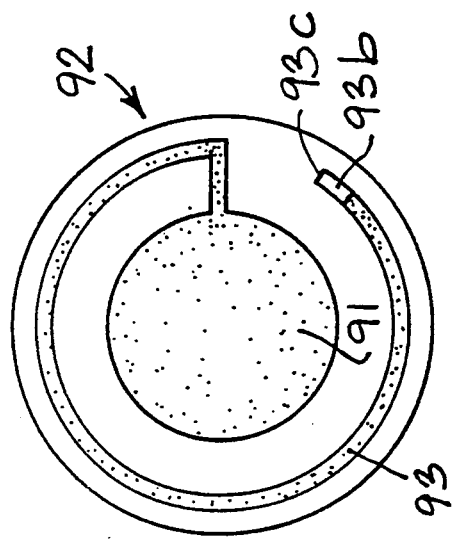
Fig. 14.
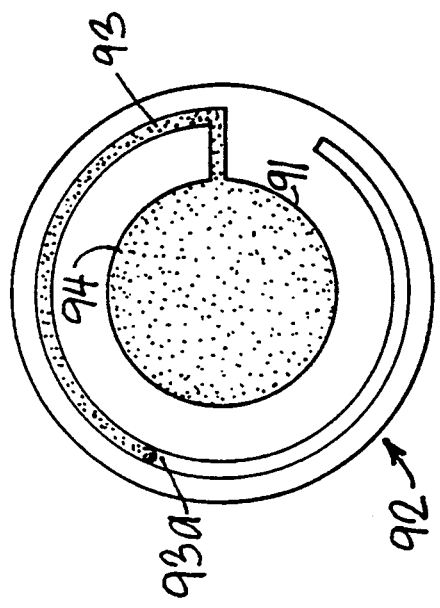
Fig. 12.
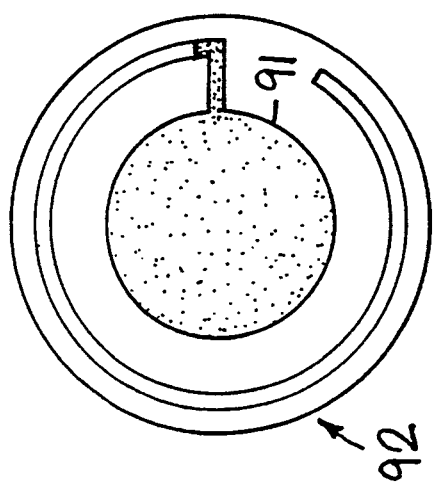
Fig. 10.
Fig. 11.

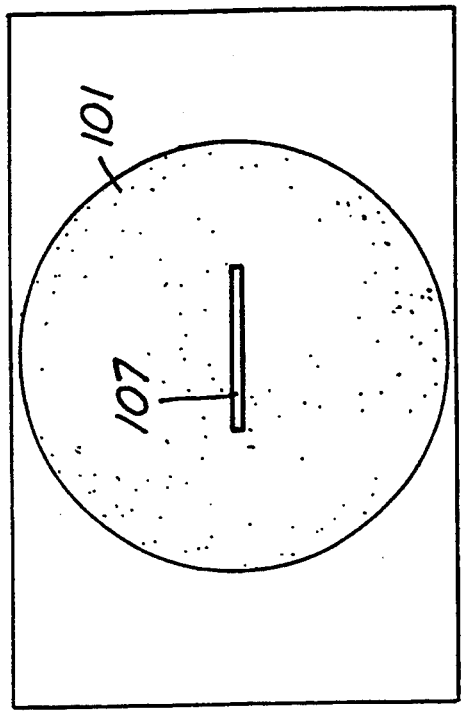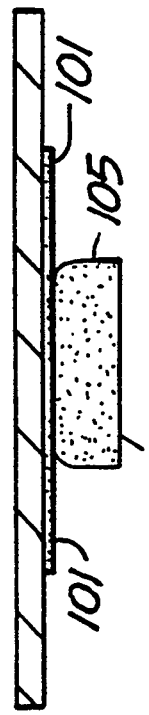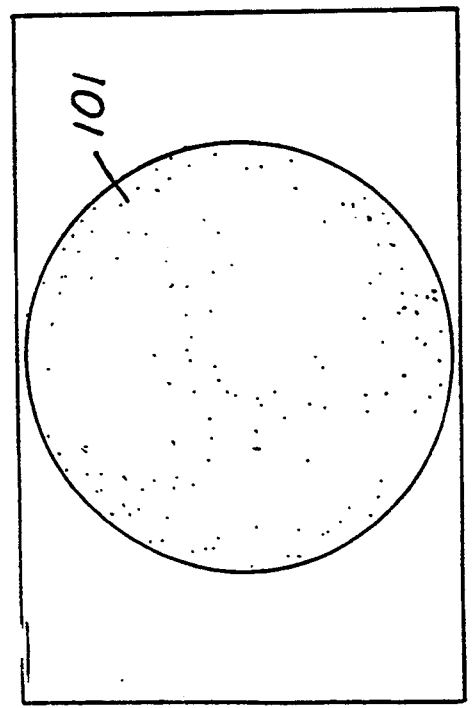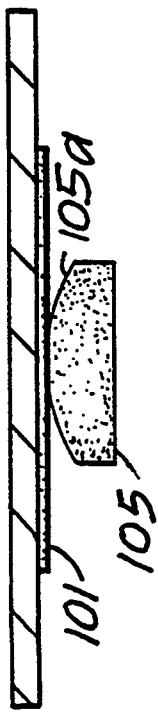

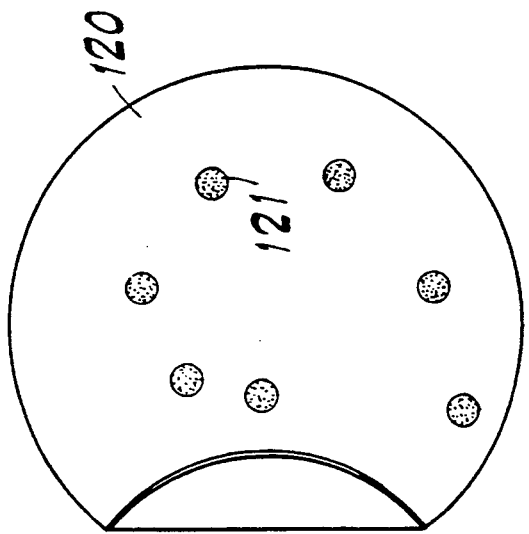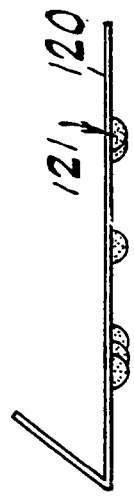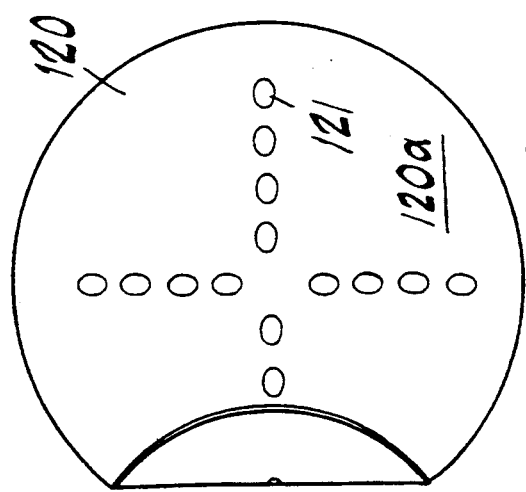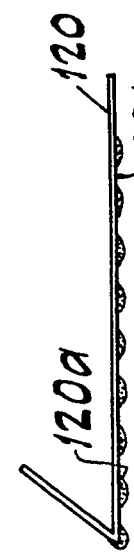

BATTERY CHARGE INDICATOR APPARATUS AND THE METHOD OF OPERATION THEREOF

This invention relates to a battery charge indicator. More particularly, this invention relates to a battery having a battery charge indicator disposed therein.

BACKGROUND OF THE INVENTION

In order to measure the state of charge of primary batteries, it is usually necessary to measure the current or voltage of the battery under test. The testing of current and voltage is usually performed with external test equipment, such as voltmeters and battery testers. The cost of the associated test equipment or testers varies widely. There are digital multimeters which will measure both voltage and current as well as devices which utilize simple resistor calibrated galvometers. There is also heat sensing material which changes color when the material is heated up by an electrical conductor which is placed across the battery terminals. In all cases of the measurement of a primary battery, it has been necessary to place the battery either in or near the tester and then to initiate the test. In some tester devices, the placing of the battery in the tester itself causes electrical contact to be made with the battery which initiates the test. In other cases, external leads from the tester are connected to the battery terminals to initiate the test. In some cases, the state of charge reading is monitored continuously by the test device, but in most cases it is done briefly in order to provide a quick sampling of the state of charge of the battery.

The principal problem with all of these methods is that an external tester of some kind must be used to measure the state of charge of primary batteries. The battery alone will not render any state of charge information to the user.

In accordance with the disclosure of U.S. patent application Ser. No. 760,200, filed Sep. 16, 1991, in the names of William Bohmer and Clark F. Bow, William Bohmer being the sole applicant herein, there is provided a battery charge indicator which is comprised of a first means to define a compressible chamber for containing a viscous gel and having an outlet therefrom as well as a second means to define a viewing channel of predetermined shape in communication with the outlet of the chamber in order to receive a flow of gel therefrom in an amount corresponding to a predetermined compression of the chamber. The battery charge indicator is incorporated into the battery, such as an alkaline battery, including a housing having an internally contained chemical cathode and anode for generating an electrical current with the cathode expanding in an amount proportional to the total current generated. The battery charge indicator is incorporated in the alkaline battery in such a manner that the compressible chamber is exposed to the cathode for compression thereby in response to an expansion of the cathode.

The cooperation between the battery charge indicator and the alkaline battery is such that when there is an electrical discharge from the battery, the internal components of the battery expand accumulatively as the battery discharges, thereby producing a force which can be used to operate the built-in battery charge indicator in order to indicate the enclosed expansion which is inversely proportional to the remaining electrical charge in the battery. Thus this battery charge indicator operates mechanically to amplify the expansion of the cathode in order to render a continuous sensitive visual state of charge indication. This battery charge indicator is typically installed at one end of the battery as a permanent part of the finished product. Further, this battery charge indicator is constructed in order to produce a visual indication of the state of charge in an analog manner.

In one construction of this battery charge indicator of application Ser. No. 760,200, the means for defining a compressible chamber is formed by a cap having a flexible section and a disk disposed on the cap in order to define the compressible chamber therebetween. In this construction, an outlet is disposed centrally of the disk in order to permit a viscous gel to be expelled from the chamber proportionally in response to the compression of the chamber caused by the expansion of the cathode of the battery. In this construction, the means defining the viewing channel may be in the form of a second disk which is mounted over the disk which forms the compressible chamber. Further, this second disk may have the viewing channel formed therein, for example, in the shape of a radially disposed section which extends from the outlet of the compressible chamber and a circular section which extends from an outer end of the radially disposed section. The viewing channel may also terminate in a reservoir located at one end of the circular section of the channel.

A cover is also disposed over the viewing channel of the battery charge indicator, which for example, may be a positive cover for the battery. In addition, the cover has a plurality of spaced apart apertures overlying the viewing channel in order to permit viewing thereof. Thus, as the gel is extruded into the viewing channel in response to the compression of the compressible chamber, the extent of the gel within the channel can be viewed. As the extent of extrusion provides an indication of the remaining charge in the battery, a simple visual indication of the remaining life of the battery is provided.

In another construction of the battery charge indicator of application Ser. No. 760,200, the compressible chamber for the gel is formed by a closed flexible end of the battery housing and a disk which is disposed over the closed flexible end of the housing. This disk is provided with an outlet into a viewing channel within an overlying second disk which is held over the end of the battery housing, for example, by means of a positive cover having apertures for viewing of the channel.

In still another construction of the battery charge indicator of application Ser. No. 760,200, the compressible chamber of the battery charge indicator may be in the form of a flexible tube of elongated shape which is disposed within the battery housing by being passed through an opening in a closed end of the housing. This tube is also provided with an outlet at one end for the gel as well as an overlying disk having a viewing channel therein for receiving the gel extruded from the flexible tube. In order to enable viewing of the gel within the viewing channels of the various embodiments, the disk in which the channel is formed may be made of transparent or translucent material.

In a further construction of the battery charge indicator of application Ser. No. 760,200, the alkaline battery is constructed of a housing having a closed end wall and a deformable wall against which the cathode expands when electrical current is being generated. In addition, a piston assembly is disposed in contact with the deformable end wall for movement therewith while a means is provided for measuring the amount of movement of the piston assembly in order to provide a visual indication of the remaining amount of the expected expansion of the cathode. The piston assembly may be constructed to include a guide pin which is disposed in contact and which extends longitudinally from the deformable end wall of the housing and an annular disk mounted on the pin for movement therewith. In this case, the means for measuring the movement of the piston assembly includes a reflector having a central bore slidably receiving the disk, a lens for viewing a reflection of a side face of the disk from the reflector, and a cover having at least one aperture overlying the lens for viewing the reflection. The disk is provided with a flat peripheral wall which is provided with an indicia to provide a visual reflected image corresponding to the remaining amount of expected expansion of the cathode, that is, the remaining amount of charge. The indicia may be in the form of a band of color or multiple bands of different color.

In use, as the battery discharges, the deformable and of the battery will expand outwardly thus causing the piston assembly to move outwardly of the housing. By means of the lens and reflector, the peripheral wall of the disk of the piston assembly can come into view with the band of color on the wall providing a measure of the amount of movement of the piston and, thus, the remaining amount of charge.

SUMMARY OF THE INVENTION

In one embodiment of the invention, the expansion at the end of the steel can of a battery is used as a diaphragm to press against a self-contained gel display which can be manufactured separately as a component, thereby providing an improvement in manufacturing and cost. The steel can is modified in that the closed end is shaped into a flexible diaphragm. When the internal ingredients expand as a result of battery discharge, the diaphragm presses against the self-contained gel display which is composed of a gel-filled blister cavity and a capillary tube with an open end. The gel display is composed of a cavity which is a blister made of a film which can be compressed against a support member and a capillary-type tube connected to the only outlet of the blister cavity. This causes the gel to be forced into the tube at a rate represented by the volume of the cavity in conjunction with the inside diameter of the tube. The result is a device which will visually display very small increments of pressure against the blister cavity in an amplified manner. The capillary tube is open at the other end to the escape of air but not to release liquids or solids to enable the gel to move freely through the capillary tube. If the tube was to be sealed at the open end to prevent the escape of air, the movement of the gel would be restricted as a result of air being compressed in the closed end. The tube is wrapped around the inner part of the support member to provide easy viewing of the capillary tube through the apertures which are cut out of the positive end cap. The end cap encloses the gel display within the battery when the positive end cap is attached welded to the steel case.

In another embodiment of the invention, there is provided a thin disk of resin or polymer material with one side coated with a dark ink or paint. The characteristic of the resin material is that when pressure is applied to the surface of the disk with an object, such as a pointed element, the translucent resin material will stretch internally with very little pressure when it is pressed by the pointed element. This causes the material to become opaque instead of translucent which creates a visible "blemish" in the area where there was pressure applied by the pointed element. This phenomenon is known as "stress-whitening".

In order to enhance the contrast of the "blemish", one side of the disk is coated with an ink or coating which is very dark. This coating is made of an ink or paint which will not separate from the surface when pressure is applied to the disk. The coating side of the disk is the side which is subjected to the direct pressure. Since the coating is opaque, it becomes the contrast enhancing background for the blemish which is viewed from the opposite side. The coating is primarily for contrast enhancement and does not break or fracture. It is the internal stretching of the resin material due to pressure that renders the visible effect, the "stress-whitening" effect. Before there is any pressure applied by the pointer element, the viewer will observe a black disk as a result of the contrast enhancing black background on the underside of the disk. When pressure has been applied to the disk by the pointed element which results in a stretching of the material, a blemish is created. The result is an optical effect comprising a white spot on a black background.

In another embodiment of the invention, the pointed element is replaced by an elongated pressure means. The elongated pressure means can be a thin knife-like element with an elongated curved edge. Before there is any pressure applied by the knife edge, the viewer will observe a black disk as a result of the contrast enhancing black background on the underside of the disk. After pressure has been applied to the disk by the knife edge, a stretching of the material occurs which creates a blemish. The resulting optical effect is a white line on a black background.

In still another embodiment of the invention there is provided a battery which has been modified to utilize the optical effect of the pressure sensitive disk. The disk is disposed between raised ridges on the closed end of the steel can and the positive end cap. The disk is trapped between the closed end of the steel can and the positive end cap at a distance calculated to present no pressure to the disk, but close enough to hold the disk in place. When the battery is connected to a load and begins to discharge, the internal chemical expansion of the battery causes the closed end of the steel can to expand, initially raising the center which forces the innermost portion of the raised ridges to press against the pressure sensitive disk. The pressure causes the disk to turn white, directly over the portion of the ridge which rises high enough to press against the disk. The amount of energy delivered by the battery is shown by the length of the white blemish generated by increased pressure on the disk which can be seen through the aperture on the positive end cap.

In a further embodiment of the invention, the contrast enhancing black background which is coated on the back side of the pressure sensitive disk can be any color desired creating such formats as white on green or white on red. Another variation is coating two colors as the contrast enhancing background in such a manner as to have two colors visible in the aperture windows. One example would be to have the color green and the color red coated in such a manner as to have the green coating covering two thirds the length of the aperture window and the red coating covering the remaining one-third of the aperture window. When the battery is fresh, the aperture window will appear as a two color strip with the green comprising two-thirds of the visible area. As the battery discharges the white blemish will begin to displace the green background until all the green is displaced, leaving only the red which is not displaced to indicate to the user that the battery is totally discharged.

In still a further embodiment of the invention, color materials can be mixed into the resin disk when it is formed. The appearance of the disk can be a translucent film of the selected color. The back of the disk is coated with a color other than the disk color and is carefully chosen to contrast against the internal color of the disk. The blemish that is created when pressure is applied to the disk will be the internal color of the disk which will contrast against the background color coated on the back. Thus one color can displace another, such as green being displaced by red.

In an additional embodiment of the invention, a color transparency can be placed over the standard white-on-black disk. When the battery is fresh and only the black background is visible, the color in the transparency is not visible. When pressure is applied to the disk, the white blemish appear behind the transparency and render the color of the transparency visible.

These and other objects and advantages of the invention will become more apparent from the following detailed description taken in conjunction with the accompanying drawings wherein:

BRIEF DESCRIPTION OF THE DRAWINGS

FIG. 1 is a exploded view of a battery with the gel-filled blister and capillary tube for indicating the state of charge of the battery.

FIG. 2 is a vertical section view of a battery employing the charge indicator shown in FIG. 1.

FIG. 5 is a plan view of a capillary tube, partly filled by gel adjacent one end portion thereof and open of the apparatus end probe thereof.

FIG. 6 is a fragmenting section view of the gel material in the capillary tube upon partial discharge of the battery.

FIG. 7 is a fragmenting section view of the gel material in the capillary tube upon complete discharge of the battery.

FIG. 8 an exploded view of the major components of another embodiment of the invention in which the capillary tube partially filled with gel material is compressed with the expanse of the battery.

FIG. 9 is an exploded view of a further embodiment of the battery constructed in accordance with the invention in which the gel-filled blister, a capillary tube, and a disk are an assembly to be installed in a battery.

FIG. 10 is a plan view of the gel-filled blister capillary tube, and the disk of FIG. 9, when the battery is full charged.

FIG. 11 is an elevation view of the blister of FIG. 9.

FIG. 12 is a plan view of the blister of FIG. 9 when the battery is partially discharged.

FIG. 13 is an elevation view of the blister of FIG. 12.

FIG. 14 is a plan view of the blister of FIG. 9 when the battery is fully discharged.

FIG. 15 is an elevation view of the blister of FIG. 13.

FIG. 16 is a vertical section view of a battery employing a coated disc providing a charge indicator when subjected to localized pressure.

FIG. 17 is a plan view of the disk of FIG. 16, filled blister shown in FIG. 2 when the battery is substantially full charged.

FIG. 20A is a vertical section view of a further embodiment of the disk for indicating charge of a battery.

FIG. 20B is a plan view of the disk of FIG. 20A.

FIG. 21A is an elevation view of the disk of FIG. 20B after the application of pressure thereto.

FIG. 21B is a plan view of the disk of FIG. 21A.

FIG. 29 is a plan view of the disk having protuberances thereon.

FIG. 30 is an elevation view of the disk of FIG. 29.

FIG. 31 is a plan view of the disk having a spiral pattern of protuberances.

FIG. 32 is an elevation of the disk of FIG. 31.

DESCRIPTION OF THE PREFERRED EMBODIMENTS

Figure 3:
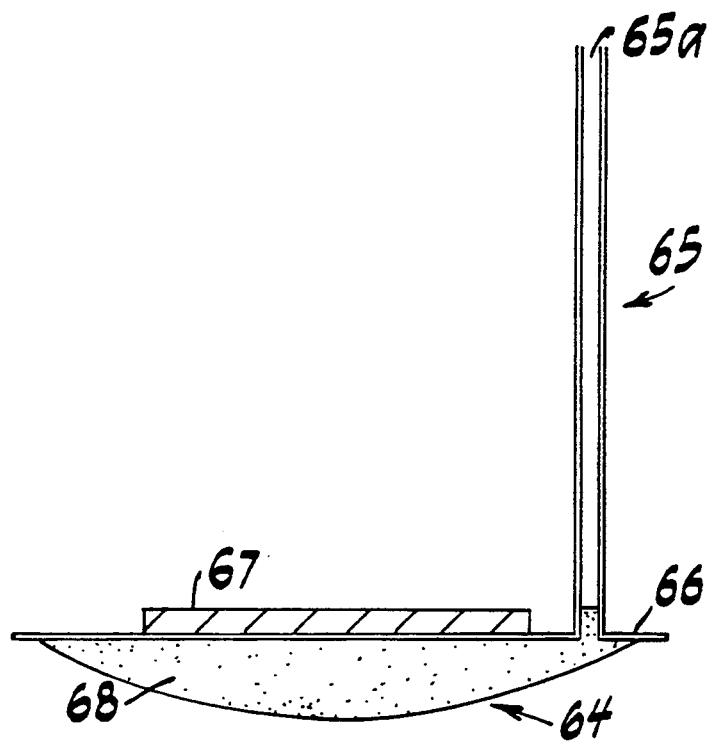
FIG. 3 is a fragmenting vertical section view of the gel-filled blister shown in FIG. 2 when the battery is substantially full charged.

Referring to FIG. 1, there is shown a standard alkaline battery which is constructed with a housing formed by a drawn steel can 56 with a closed end 56a. A positive 62 is spot welded separately to the steel can 56 at the closed end. Inside the can 56 are the basic components of an alkaline long-life battery. The two major areas are a cathode 57 and an anode 58 divided by a non-woven fabric 59 which acts as a separator for the two major chemical components which are manganese dioxide for cathode 57 and powdered zinc for anode 58 with potassium hydroxide as an electrolyte. In the inside of the center area of the battery is a brass member 60 which acts as a current collector that passes through a nylon seal at the opposite end of the battery by means of a rivet which makes contact with the negative cover (not shown). When the circuit is closed by connecting the anode 58 to the cathode 57 through some kind of load, a current will develop within the battery causing the cathode 57 to expand as the battery is discharged. The expansion is accumulative and can be calculated for specific size alkaline batteries. The expansion has a predictable characteristic which can be linear, exporitial, or non-linear. Regardless of the particularly characteristic, the total expansion reached is a function of the total current taken from the battery. If the current flow is substantial then the expansion will proceed rapidly. If the current flow is low than the expansion will proceed slowly. The result in either manner is an accumulative expansion representing the amount of power dissipated by the battery. The expansion is relatively small and usually not visually distinguishable without the aid of measuring devices such as micrometers.

FIG. 1 is an exploded view of an improvement to the gel display construction which was disclosed in the U.S. patent application Ser. No. 760,200. The embodiment in FIG. 1 utilizes the expansion of the end 56a of the steel can of a battery 61 as a diaphragm in the same manner as the previous construction; however the diaphragm presses against a self-contained gel display 67 which can be manufactured at low cost. The steel can 56 is modified in that the closed end 56a is corrugated end shaped into a flexible diaphragm 61 and 62. When the internal ingredients expand as a result of battery discharge, the diaphragm presses against the self-contained gel display 63 which is composed of a gel-filled blister cavity 64 and capillary tube 65 with an open end 65a. The gel display 63 is composed of cavity 64 which can be a blister made of a film which can be compressed against support members 66 and 67. The capillary type tube is connected to the only outlet 64a of the blister cavity. This results in the gel being forced into the tube 65 at a rate represented by the volume of the cavity 64 in conjunction with the inside diameter of the tube 65 resulting in a device which will visually display very small increments of pressure against the blister cavity 64 in an amplified manner. The tube 65 is open at the end 65a to enable the gel 68 to move freely through the capillary. If the tube 65 was sealed at the open end 65 the movement of the gel 68 would be restricted as a result of the air being compressed in the sealed 66 end.

The capillary tube is wrapped around the periphery of the support member 66 in such a manner as to enable easy viewing of the capillary tube 65 through the apertures 70 which are cut out of the positive end cap 62. The end cap encloses the gel display within the battery 61 when the positive end cap 62 having contact 62a is welded to the steel case 56.

FIG. 2 is a cutaway side view of the battery 61 showing the improved gel display installed in the closed end 56a of the steel can 56. When the battery 61 is discharged, the closed end 56a of the steel can will expand and press against the self-contained gel-filled blister cavity 64 which will force the gel to move through the tube 65 at a rate proportional to the internal expansion of the alkaline cell.

FIG. 3 is an isolated view of the gel-filled cavity and tube. The component is made up of support members 66 and 67 with a blister 64 made of flexible film which is sealed to the support member 66 around a predetermined amount of gel 68 which is then trapped inside the formed blister 64. The support member 66 also contains an inner section 67 which allows the flexible tube 65 to be positioned around it in a circle with the inner section being of such a diameter and height to guide the tube 65 around and under the apertures 70 in the positive end cap 62 shown in FIG. 2 without the tube 65 touching the bottom of the positive end cap 62.

Figure 4:
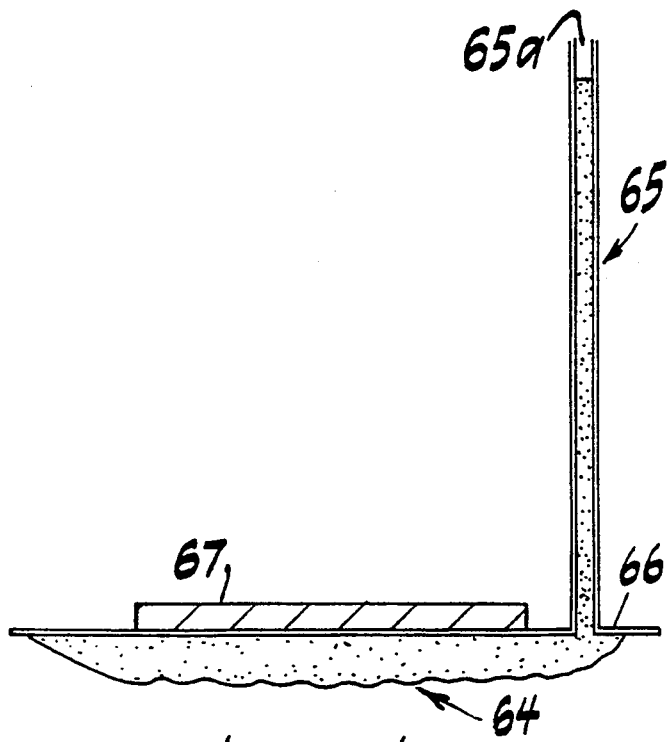
FIG. 4 is a vertical section view of the gel-filled blister shown in FIG. 2 when the battery is substantially discharged.

FIG. 4 is the same view as 3 except that it shows what happens the result of the blister 64 being compressed by the diaphragm 60 and 61 of the closed end 56a of the battery, thereby forcing the gel 68 as shown in FIG. 4 to enter and progress along the capillary tube 65. The tube 65 is open add permeable to gas at end 65a to allow the gel to move freely through the tube. Thus there is no sealing of the tube which would require the gel 68 to move against air compresses with the closed end of the tube 65. The pressure required to move the gel through a closed system would increase as the gel progresses through the tube 65. If the blister 64 film is permanently attached to the closed end 56a of the battery and the battery recovers some of its original electrical charge the closed end 56c of the steel can 56 can contract, thereby causing the blister to expand and to causing some of the gel back to return to the blister as a result of atmospheric pressure pushing the gel back towards the blister cavity 64.

FIG. 5 is a view of a capillary tube 71 which is closed at one end 71a and open at the other end 71b. The tube is partially filled with gel 72 adjacent 71 to the closed end 71a.

In FIG. 6 the capillary tube 71 is shown placed between the pressure 72 members 72 and 73 which are separated by the width of the tube 71. The gel 72 is contained at the sealed end 71a of the tube 71 and extends to adjacent mid-point 71c of the tube 71.

FIG. 7 shows the tube 71 under pressure as a result of pressure members 72 and 73 moving towards one another which causes the tube 71 to be compressed thereby forcing the gel 72 towards the open end 71b of the tube 71. When the pressure is released by moving pressure members 72 and 73 away from one another the diameter of the tube 71 will return to the larger diameter shown in FIG. 6 if the tube is sufficiently elastic and flexible.

FIG. 8 is an exploded view of the partially gel-filled capillary tube 71 installed in an alkaline battery. The battery steel can 56 has a closed end 56a which is formed to move easily with the expansion of the internal components of the battery 80 due to discharge. The tube 71 is placed in the center of a color background disk 81 and beneath disk 82 which covers the cavity created by the contact 83 in the positive end cap 84. The apertures 85 are cut in such a manner as to leave a small tabs 85a of metal which can be positioned below the aperture 85 to act as a guide to position the open end 71a of the tube 71 around and under the apertures 85.

FIG. 9 is an exploded view of a heat sealed gel-filled blister 91 and capillary disk 92 installed in an alkaline battery 90. The gel-filled blister disk 92 is a completely self-contained system which contains all the components that are required to measure and indicate the amount of expansion of the closed end 56a of battery 90. The blister 91 and capillary 93 are created when a flexible film 91a is sealed against disk structure 91 with the gel 64 sealed in at the same time. The gel-filled blister disk 91 is placed on the end of 56a of the battery with another disk 95 placed over the blister 91 which covers the cavity created by the contact 96a in the positive end cap 96. When the components are assembled and the battery terminals are connected to a load, the battery will discharge, causing the internal components of the battery to expand in relation to the amount of discharge which in turn causes closed end 56a to move against the trapped gel-filled blister disk 91. As the expansion continues the gel 91a is forced out of the reservoir of blister 91 and into the capillary section 93 of the blister disk 92. The amount of gel 91 is predetermined so that when the battery is totally discharge and the blister reservoir has totally collapsed, the gel 91 will only reach the section of the capillary section in advance of the open end 93a of the capillary 93 is open to atmospheric pressure to facilitate smooth movement of the gel 94a through the capillary.

FIG. 10 is a plan view of the disk 92 showing the blister 91 completely filled with gel 94 and the capillary section 93 only partially filled with gel 94 at the beginning of the discharge of the battery. FIG. 11 shows blister 91 in elevation above disk 92.

FIGS. 12 is a plan view of the disk 92 showing the amount of gel 94 in the blister reservoir 91 reduced as a result of continued expansion of the internal components of the battery due to the discharge of the battery. The gel 94 has moved through the capillary 93 to the half-way point 93a, indicating that the battery is fifty percent discharged. FIG. 13 shows blister 91 in elevation above disk 92.

FIG. 14 is a plan view of the disk 92, showing the amount of gel 94 in the blister reservoir 91 reduced even further as a result of continued expansion of the internal components of the battery due to the total discharge of the battery. The 94 was moved through the capillary 93 to the end point 93b just before the free end 93c of the open capillary tube 93.

A further embodiment of the invention is shown in FIGS. 16 and 17.

FIGS. 16 and 17 shows a charge indicator 100 comprising a thin disk 101 of resin material with one side 101a coated with a dark ink or paint 102.

Figure 18B:
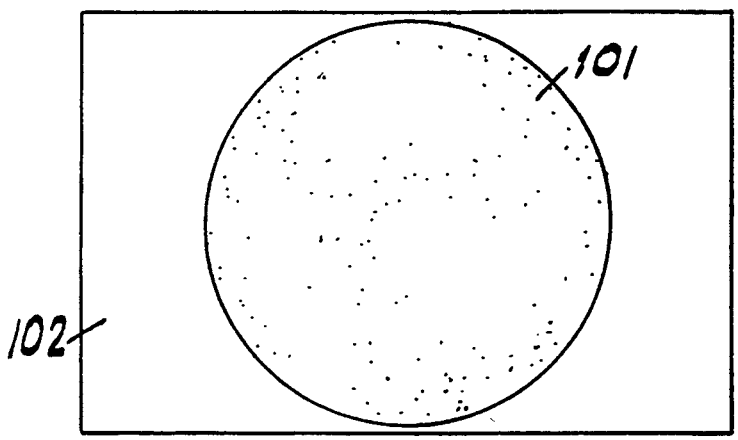
FIG. 18B is a plan view of the disk of FIG. 16.
Figure 18A:
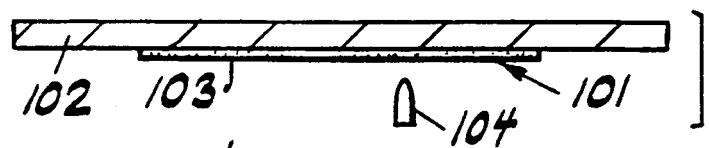
FIG. 18A is a vertical section view of the disk of FIG. 16.

In FIG. 18 there is shown resin material disk 101 in direct contact with a soft flexible transparent member 102. The transparent material can be resin material such as polystyrene material, polystyrene material bring chemistry polystyrene material, and other resin and polystyrene materials. The characteristic of the resin material of disk 101 is that when pressure is applied to the surface of the disk 101 with an object such as the point tip 103, the translucent resin material 102 will stretch internally with very little pressure when it is pressed by the pointer tip 104. The internal stretching cause the material to become opaque instead of translucent which creates a visible "blemish" in the area where there was pressure applied by the pointer tip 104. This phenomenon in resin material is called "stress whitening" to enhance the contrast of the "blemish", one side of element 101 is coated with an ink or coating 103 which is dark. This coating 101 is made of an ink or point which is not separate from the surface of element 101 when pressure is applied to the disk. The coating 103 is applied in the side of element 104 which is subject to the direct pressure by pointer 104. Since the coating 103 is opaque, it becomes the contrast enhancing background for the blemish in disk 10 which is viewed from the other side of disk 101 through transparent support 102. It is noted that the coating 103 is simply for contrast enhancement and does not break or fracture. It is the internal stretching of the resin material of disk 101 due to pressure of part 104 which is simply for contrast enhancement and does not break or fracture. It is the internal stretching of the resin material of disk 101 due to pressure of part 104 that renders the visible effect.

Figure 19B:
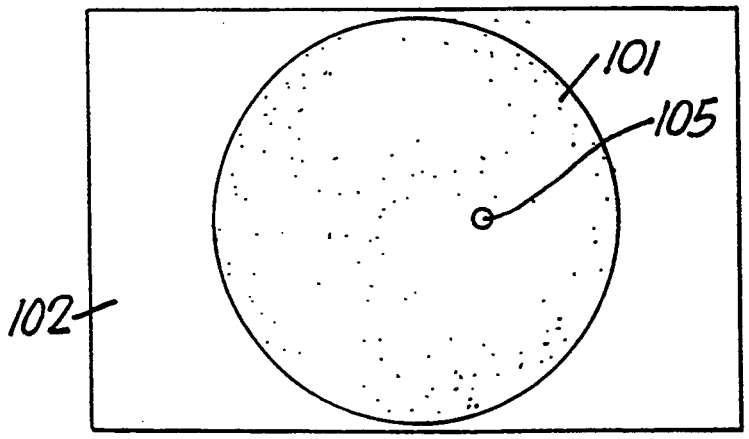
FIG. 19B Is a plan section view of the disk of FIG. 16 when subjected to pressure.
Figure 19A:
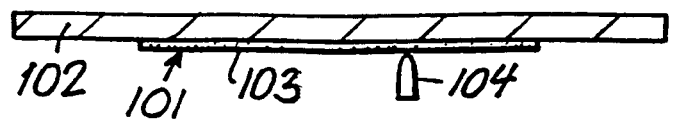
FIG. 19A is a vertical section of the disk of FIG. 16.

FIG. 18b shows the disk 101 before there is any pressure applied by the pointer tip 104. The viewer will observe a black disk 101 as a result of the contrast enhancing black background 103 on the underside of the disk 101. In FIG. 19b, pressure has been applied to the disk 101 of pointer tip 104 which results in a stretching or "stress whitening" of the material, thereby creating a blemish 105. This effect is a result of modifying the molecular structure of the resin material disk with applied pressure causing the light passing through this section to scatter substantially compared to the other areas where no pressure has been applied thereby allowing light to be passed through and to be absorbed by the black background 103 on the reverse side of disk 101. Then optical charge indicating effect is a what spot 105 on a black background of disk 101.

FIGS. 20a and 20b shows disk 101 with the pointer tip 104 replaced with pressure element 105. The pressure element 105 can be a thin knife-like member object with an elongated 105a curved edge. FIGS. 20a and 20b shows the disk 101 before there is any pressure applied by the knife edge 105a. The viewer will observe a black disk 101 as a result of the contrast enhancing black background 103 on the underside of the disk 101. In FIGS. 21a and 21b pressure has been applied to the disk 101 by the knife edge 105a which results in a stretching of the material thereby creating a blemish. This effect is a result of modifying the molecular structure of the resin material of disk 101 with applied pressure causing the light passing through this section to scatter substantially, compared to the other areas where no pressure was applied. This results in light passing through and being absorbed by the black background 103 on the reverse side of disk 101. The optical effect is a white line 107 on a black background of disk 101.

Figure 22:
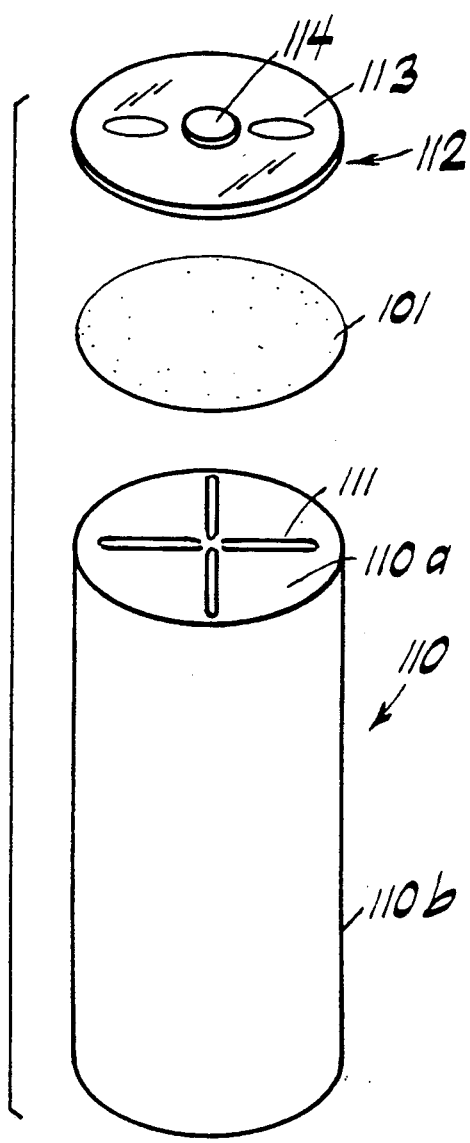
FIG. 22 is an exploded view of a battery with the disk for indicating the state of charge of the battery.

FIG. 22 is an exploded view of a battery 110 which that has been modified to utilize the optical effect of the pressure sensitive disk 101 discussed above to indicate the energy remaining in the battery 110. This is a accomplished by placing the disk 101 between the raised ridges 111 on the closed end portion 110a of the steel can 110b and the positive end cap 112. The disk 101 is trapped between the closed end portion 110a of the steel can 110b and the positive end cap 112 at a distance calculated to present no pressure to the disk 101 but sufficient to hold the disk 101 in position.

Figure 23:
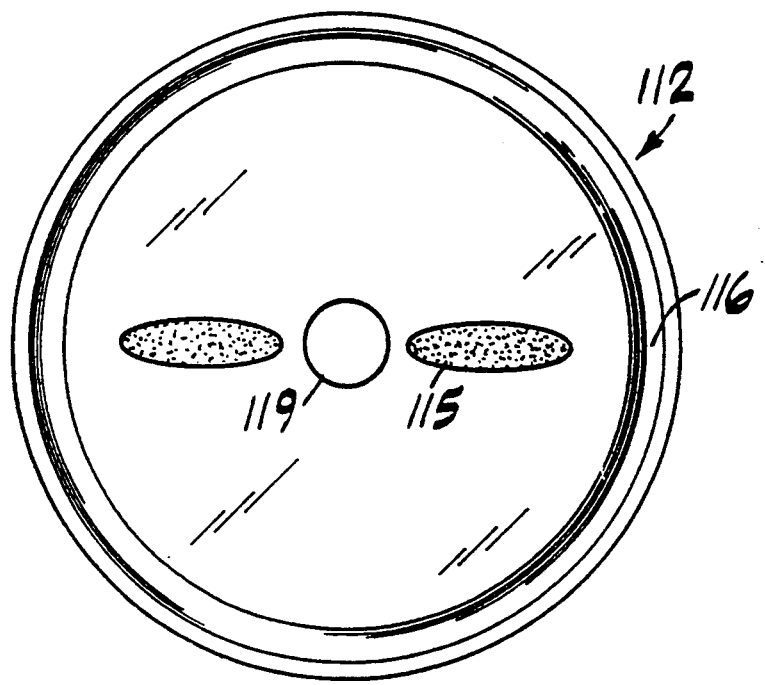
FIG. 23 is a plan view of a battery employing the disk as a charge indicator.
Figure 24:
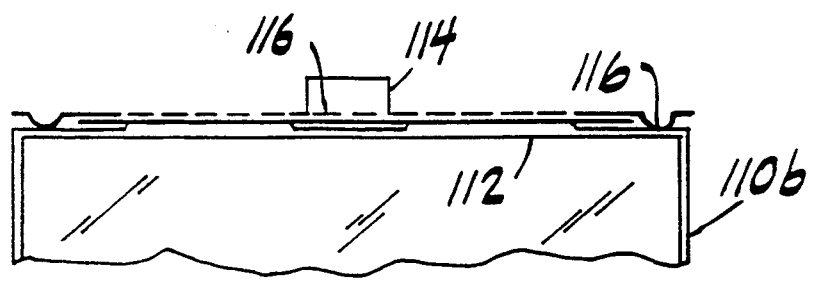
FIG. 24 is a vertical section view of the disk of FIG. 23 when the battery is full charged.

FIGS. 23 and 24 are more detailed views of the battery 110 shown in FIG. 22. The plan view of FIG. 23 shows the end cap 112 which contains the raised contact 114, an elongated aperture 115 and a circular depression 116 which when placed on the closed end 110a of the steel can 110b creates a space calculated to hold the pressure sensitive disk 101. FIG. 24 shows the components related to disk 101 installed in battery 110. The positive end cap 112 contains apertures and a circular depression 116. The pressure sensitive disk 101 is placed directly under the positive end cap 112 and rests inside the perimeter of the circular depression 116 and on top of the raised ridges 111 in the closed end of the steel can 110b. The black pressure sensitive disk 101 is visible through the apertures 115. When the battery 110 is new and unused, the closed end 110a of the steel can 110b is relatively flat which results in no pressure being applied to the disk 101 through the raised ridges 111.

Figure 25:
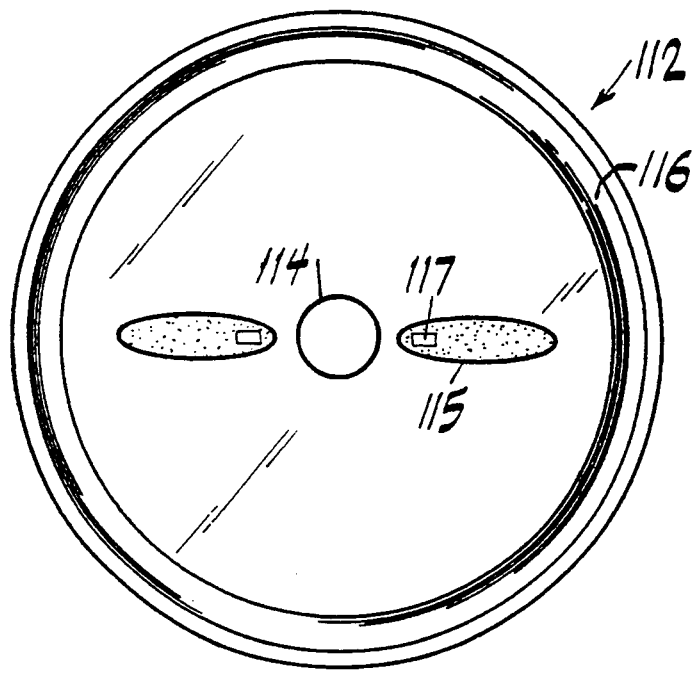
FIG. 25 is a plan view of the disk when the battery is partially discharged.

FIG. 25 shows battery 110 after being connected to a load and beginning to be discharged. The internal chemical expansion of the battery 110 causes the closed end of the steel can 110a to expand, raising the center portion initially first which forces the inner most portion of the raised ridges 111 press against the pressure sensitive disk 101. The pressure causes the disk 101 to turn white directly over the portion of the raised ridge 111 which rise high enough to press against the disk 101. The energy or charge taken from the battery is expressed by the length of the white blemish 117 generated by increased pressure on the disk 101 that can been seen through the apertures 115 on the positive end cap 112.

Figure 26:
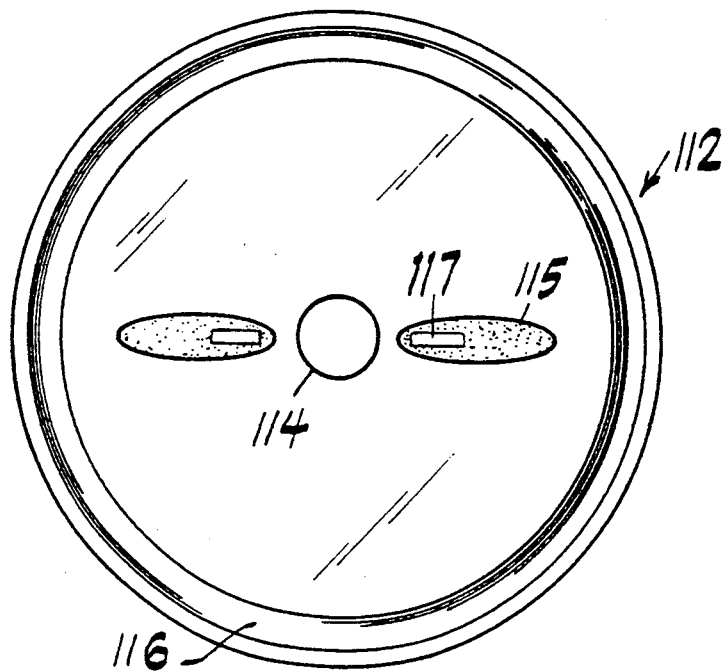
FIG. 26 is a plan view of the disk capillary tube, partly filled when the battery is half discharged.

FIG. 26 shows the result of what happens when the battery is connected to a load and continues to discharge. The internal chemical expansion of the battery causes the closed end 100a of the steel can 110b to expand further which forces an increased portion of the raised ridges 111 to press against the pressure sensitive disk 101. The pressure causes the disk 101 to turn white directly over the rising ridges 111 which has risen enough to press against the disk 101. The energy consumed from the battery 110 is shown by the length of the white blemish 117 generated by increased pressure on the disk 101 which can be seen through the aperture 115 on the positive end cap 112.

Figure 27:
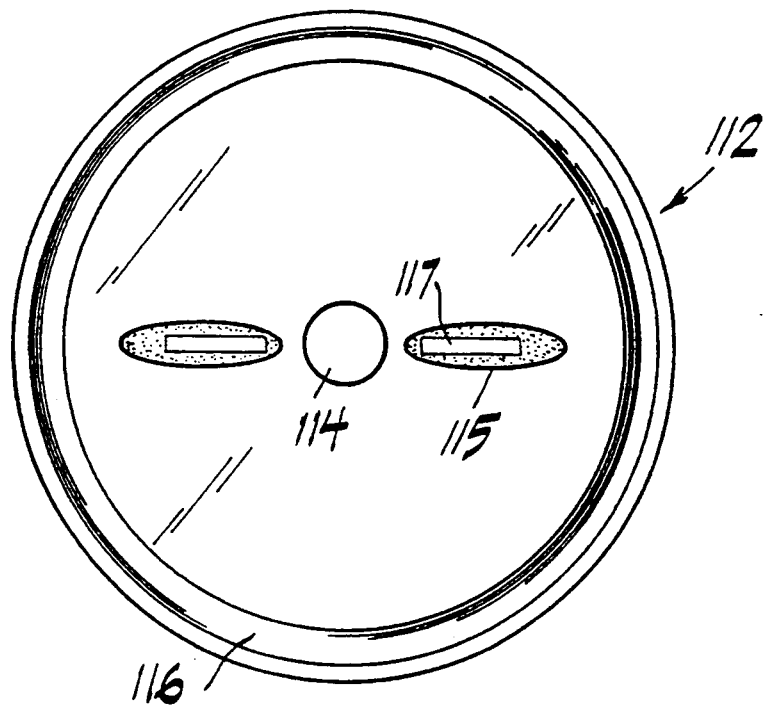
FIG. 27 is a plan view of the disk when the battery is substantially discharged.

FIG. 27 shows the charge indicator when the battery is connected to a load and continues to discharge. The internal chemical expansion of the battery causes the closed end 110a of the steel can 110b to expand further which forces an increased portion of the raised ridges 111 to press against the pressure sensitive disk 101. The pressure causes the disk 101 to turn white directly over the increasing portion of the raised ridges 111 that rises high enough to press against the disk 101. The energy extracted from the battery is expressed by the length of the white blemish 117 generated by increased pressure on the disk 101 which can be seen through the aperture 115 on the positive end cap 112.

Figure 28:
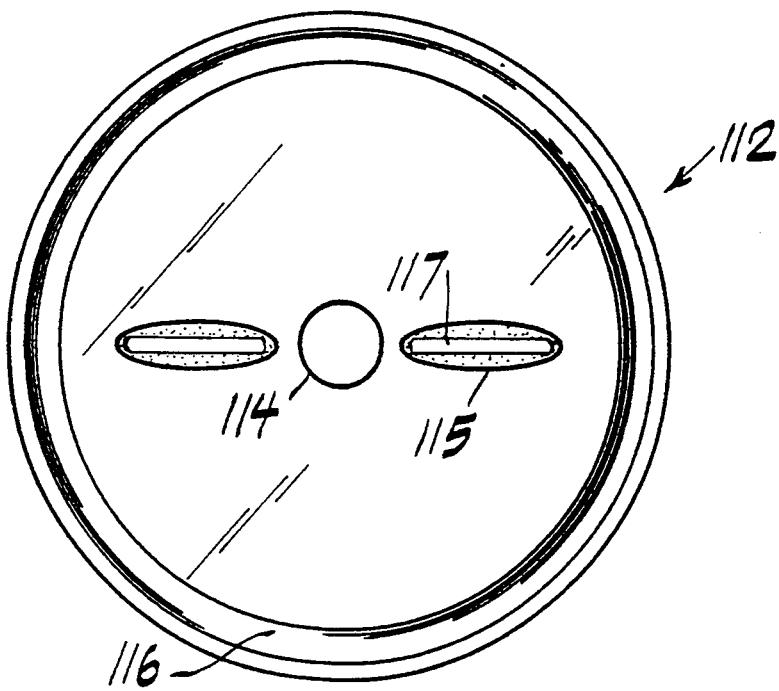
FIG. 28 is a plan view of the disk upon complete discharge of the battery.

FIG. 28 shows the charge indicator when the battery is totally discharged.

It should be pointed out that the white on black format of the pressure sensitive disk 101 is not the only available presentation. The contrast enhancing black background which is coated on the lower side of the pressure sensitive disk 101 can be any color desired, thereby creating such formats as white on green or white on red. Another variation is coating two colors as the contrast enhancing background in such a manner as to have two colors visible in the aperture windows 115. One example would be to have the color green coating covering two-thirds of the length of the aperture window 115 and the red coating covering the remaining one third of the aperture windows. When the battery is fresh the aperture window will appear as a two color strip with the green comprising two thirds of the visible area. As the battery discharges, the white blemish will begin to displace the green background until all the green is displaced, leaving only the red which is not displaced. This presentation indicates to the user that the battery is totally discharged.

Another variation is to mix color into the resin material disk 101 when it is made. The appearance of the resin material disk 101 would be a translucent film of the selected color. The back of the disk 101 is coated with a color other than the disk color and is chosen to contrast against the internal color of the disk. The blemish 117 which is created when pressure is applied to the disk 101 will be the internal color of the disk 101 which will contrast against the background color coated on the disk which renders one color displacing another such as red displacing green.

Another variation is to place a color transparency over the standard white on black disk 101. When the battery is fresh and only the black background is visible the color in the transparency is not visible. When pressure is applied to the disk 101, the white blemish 117 appears behind the transparency and render the color of the transparency visible.

FIGS. 29 and 30 are plan and elevation views of a pressure sensitive disk 120 which contain dimples 121 which are molded in the disk 120 when the disk is made. The dimples 121 can be shallow craters or solid dimples formed when the disk 120 is molded. The purpose of the dimples 121 is to eliminate the need for raised ridges 111 on the surface 100a of the closed end of the steel can 110b of the battery 110 as shown in FIG. 22. As shown in FIGS. 29 and 30, small dimples 121 are molded in a cross pattern in the disk 120. The perimeter of the dimples on the upper surface 120a of the disk 120 will turn opaque and blemish when pressure is applied to the rounded portion of the dimples from beneath. The bottom surface 120b of disk 120 can be treated with a contrast enhancing coatings in the same way as described above for the standard flat pressure sensitive disk 101. The disk 120 can is coated black on the underside 120b and substituted for the flat disk 101 described in the previous embodiments. When this disk 120 is substituted for the standard flat pressure sensitive disk 101 described in FIGS. 22–28, the dimples 121 which are part of the disk 120 provide self-contained pressure points which replace the raised ridges 111 shown in FIG. 22. This construction can reduce cost even further in that the modification of the basic steel battery can is reduced substantially. As shown in FIG. 29 four groups of white dots 122 will progress from the center to the edge of the disk 120 as the battery is discharged thereby producing a cross pattern.

As shown in FIGS. 31 and 32, the pattern of the dimples 121 is a spiral rather than a cross pattern as shown in FIG. 29.

Figure 33:
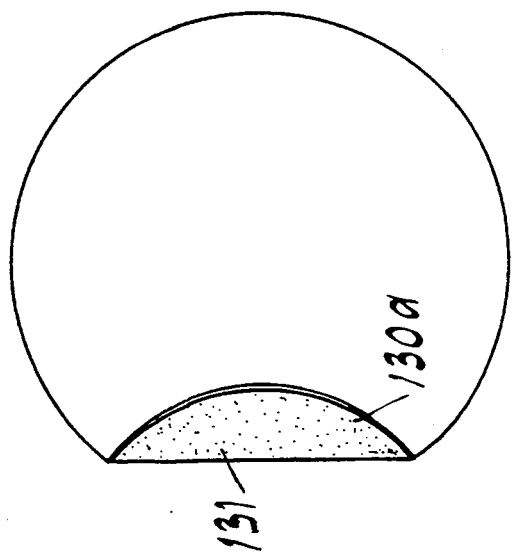
FIG. 33 is a plan view of the disk with granules thereon.
Figure 34:
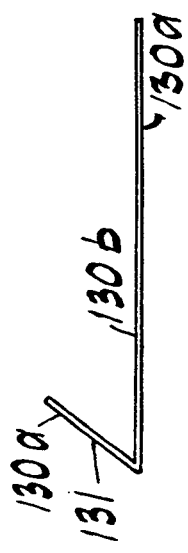
FIG. 34 is an elevation view of the disk of FIG. 33.

FIGS. 33 and 34 are plan and elevation views respectively of another variation of a pressure sensitive disk 130 which does not require modification of the closed end of the steel battery can such as raised ridges 111 shown in FIG. 22. In the embodiment of FIGS. 33 and 34, coarse particles 131 are coated on side 130a of the disk 130. The contrast enhancing coating can be combined with the particles when the disk 130 is made. The size of the particles is selected to be large enough to put adequate pressure on the disk 130 to cause blemishing. When this disk 130 is substituted for the standard flat pressure sensitive disk 101 described in FIGS. 22–28, the particles 131 which are part of the disk 130 provide self-contained pressure points which can be eliminate the need for the raised ridges 111 of FIG. 22. This construction can reduce cost even further in that the modification of the basic steel battery can is reduced substantially. A white dot which starts in the center of the disk 130 will get larger and larger as the battery discharges, until the dot reaches some maximum diameter which will be close to the circumference of the disk 130.

Figure 35:
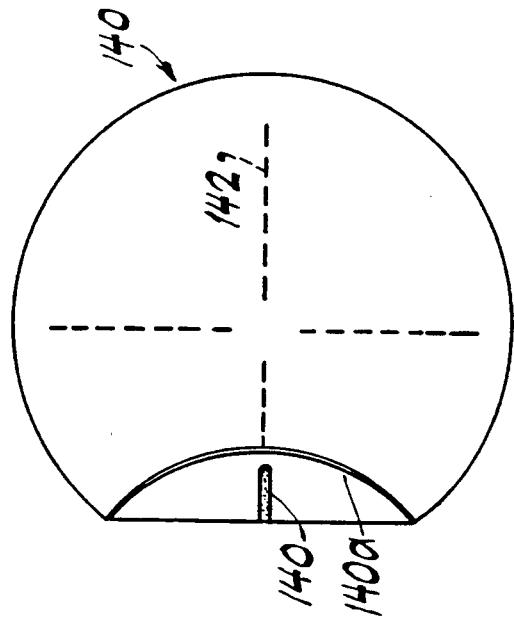
FIG. 35 is a plan view of the disk with ribs thereon.
Figure 36:
FIG. 36 is an elevation view of the disk of FIG. 35.

FIGS. 35 and 36 are plan and elevation views of another embodiment of the pressure sensitive disk of the invention which does not require modification of the closed end of the steel battery. In this embodiment, disk 140 is provided with four stiff strips 141 which are coated on one side 140a of the disk 140. The contrast enhancing coating can be combined with the stiff strips when the disk 140 is made. The size and shape of the strips 141 are selected to enable adequate pressure to be applied to the disk 140 to cause blemishing. When this disk 140 is substituted for the standard flat pressure sensitive disk 101 described in FIGS. 22–28 the stiff strips 141 which are part of the disk 140 provide self-contained pressure points which can replace the raised ridges 111 shown in FIG. 22. This reduces costs in that the modification of the basic steel battery can is reduced substantially. Four groups of white lines 142 which will progress from the center to the edge of the disk as the battery is discharged resulting in a cross pattern.

Figure 37:
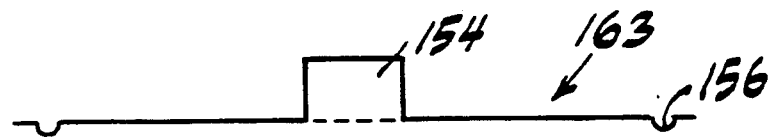
FIG. 37 is a vertical section view of a support for the disk.
Figure 38:
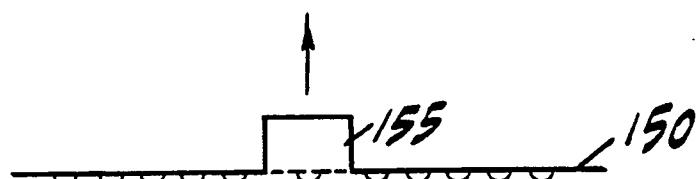
FIG. 38 is a vertical section view of a support overlying the disk.
Figure 39:
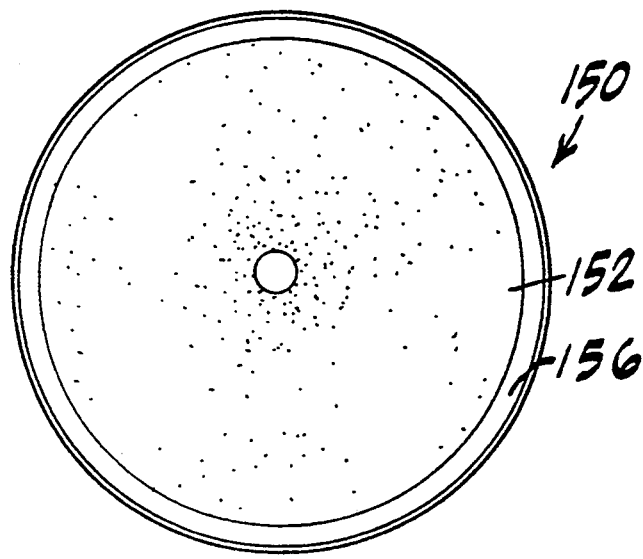
FIG. 39 is a plan view of the disk of FIGS. 37 and 38.

FIGS. 37–39 show another embodiment of the charge indicator of the invention. FIGS. 38 and 39 show the elevation and plan view of a pressure sensitive disk 15 which is molded into a form which will fit and be retained inside the positive end cap of the battery. The performed disk 15 as shown in FIG. 38 is of the dimple type (dimples 151) with a black contrast enhancing coating 152. The positive end cap 153 is shown in FIG. 37 contact tip 154 and welding channel 155 which accepts the shaped pressure sensitive disk 150. Disk 150 has a projector 155 which fits snugly into the hollow contact tip 154. The diameter of the performed disk 150 is selected to fit inside the welding channels 156. The dimples 151 are placed under the apertures (not shown) before the disk 150 is inserted into the positive end cap.

Figure 40:
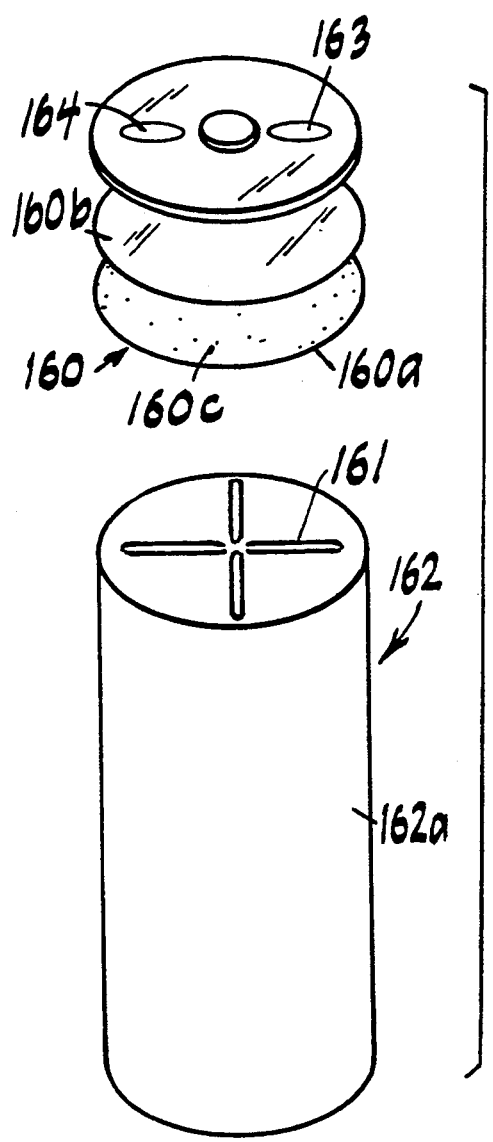
FIG. 40 is an exploded view of the charge indicator with a color element adjacent the disk.

FIG. 40 shows another embodiment of the charge indicator of the invention.

FIG. 40 is an exploded view of a two part disk assembly 160 which utilizes carbonless paper. Carbonless paper is a material which contains very small encapsulations of ink, trapped in the paper fiber. When pressure is applied to the paper, the ink encapsulations burst and release the ink in the area of the paper to which pressure is applied, leaving an impression. The paper and ink colors can be selected for any application. The encapsulated ink is usually on one side of the paper and may be black contrasting against a light colored paper. In FIG. 40 the carbonless paper is placed over the raised edges 161 on the closed end 162a of the battery 162 and under a transparent plastic disk 160b. When the steel can 162a expands and the raised ridges 161 press upwardly against the carbonless paper 160a. The carbonless paper 160a is held firmly in place by transparent disk 160b and the positive end cap 163. As a result an impression is made on the upper side 160c of the carbonless paper 160c and can be seen through the aperture 164. Four groups of black lines (now shown) will extend from the center to the edge of the disk 160 as the batter 162 is discharged. This results in a cross pattern. The carbonless paper can utilize multiple variations of ink color and paper color to achieve any desired amount such as red ink being exposed on green paper.

The advantages of the present invention, as well as certain changes and modifications of the disclosed embodiments thereof, will be readily apparent to those skilled in the art. It is the applicant's intention to cover by his claims all those changes and modifications which could be made to the embodiments of the invention herein chosen for the purpose of the disclosure without departing from the spirit and scope of the invention.

What is claimed is:

1. A battery charge indicator for a battery including a housing having an internally contained chemical cathode and anode for generating an electrical current when connected through one another through an external load, the cathode expanding in an amount proportional to the amount of electrical energy delivered by the battery, the battery charge indicator comprising:

first means defining a compressible chamber adapted to be inserted as an assembly into the battery, the compressible chamber including structure forming a blister, the gel being disposed in the interior of the blister, the blister having an outlet from the interior of the blister, the blister being adapted to be compressed in the response to the expansion of the cathode, and second means defining a viewing channel, the viewing channel being in communication with the outlet of the blister to receive a flow of gel therefrom in an amount corresponding to compression of the blister in response to the expansion of the cathode.

2. The battery charge indicator in accordance with claim 1 in which the blister comprises film material forming a cavity within which the gel is disposed and to which the outlet of the blister is connected.

3. The battery charge indicator in accordance with claim 1 in which the housing of the battery has a closed end portion which is adapted to deflect away from the interior of the housing in response to the expansion of the cathode, the blister adapted to be disposed adjacent the closed end portion being adapted to compress the blister and the gel therein.

4. The battery charge indicator in accordance with claim 3 in which the closed end portion of the battery is formed as a diaphragm to deflect away from the interior of the housing in response to the expansion of the cathode against the closed end portion.

5. The battery charge indicator in accordance with claim 4 in which the diaphragm of the closed end portion of the housing comprises a central flat portion and an outer peripheral portion supporting the central flat portion with respect to the wall of the housing, to which the closed end portion is attached, the peripheral portion being flexible to enable the central flat portion to deflect away from the interior of the housing in response to the expansion of the cathode against the flat central portion and the peripheral portion.

6. A battery charge indicator in accordance with claim 5 in which the flexible peripheral portion comprises a plurality of circumferential corrugations.

7. A battery charge indicator in accordance with claim 1 in which the side of the blister is attached to a support member adapted to extend transversely with respect to the longitudinal axis of the batter, the support member preventing movement blister with respect to the support member when the blister is compressed in response to the expansion of the cathode.

8. A battery charge indicator in accordance with claim 7 in which the blister is attached to the support member.

9. A battery charge indicator in accordance with claim 8 in which the support member has an opening adjacent to the outlet of the blister.

10. A battery charge indicator in accordance with claim 8 is sealed with respect to the support member and the opening therein.

11. The battery charge indicator in accordance with claim 7 in which the elongated tube is disposed circumferentially with respect to the side of the support member opposite the side thereof to which the blister is adjacent.

12. The battery charge indicator in accordance with claim 7 in which an additional support member is attached to the side of the support member opposite the side thereof adjacent to the blister, the additional support member having a lateral dimension less than that of the support member, the viewing channel being adapted to be disposed about the periphery of the additional support member.

13. The battery charge indicator in accordance with claim 12 in which the viewing channel is a tube disposed circumferentially about the periphery of the additional support member.

14. A battery charge indicator in accordance with claim 1 in which the second means defining a viewing channel includes means for venting gas therefrom in response to the flow of gel thereunto.

15. A battery charge indicator in accordance with claim 1 in which the second means defining a viewing channel includes means for releasing gas while blocking the passage of gel therethrough.

16. The battery charge indicator in accordance with claim 1 in which the viewing channel is of a volume at least equal to the volume of the blister.

17. The battery charge indicator in accordance with claim 1 within which the viewing channel has a vent hole in communication with the interior thereof.

18. The battery charge indicator in accordance with claim 1 in which the second means defining the viewing channel comprises an elongated flexible tube disposed in the housing.

19. The battery charge indicator in accordance with claim 18 in which the elongated flexible tube has a transverse cross-section.

20. The battery charge indicator in accordance with claim 19 in which the transverse cross-section.

21. The battery charge indicator in accordance with claim 18 in which the elongated tube is disposed circumferentially with the respect to the blister.

22. The battery charge indicator in accordance with claim 1 and further comprising a cover disposed over the viewing channel, the cover having a plurality of spaced apart apertures overlying the channel for viewing thereof.

23. The battery charge indicator in accordance with claim 22 in which the cover is made of electrically conductive material.

24. A battery charge indicator for a battery including a housing having an internally contained chemical cathode and anode for generating an electrical current when connected to one another through an external load, the cathode expanding in an amount proportional to the amount of electrical energy delivered by the battery, the battery charge indicator comprising:
first means defining a disk adapted to be inserted as an assembly into the battery and visible therein, the appearance of the disc changing in response to the application of localized pressure thereto,
and second means adapted to apply localized pressure to the disc in response to the expansion of the cathode.

25. The battery charge indicator in accordance with claim 24 in which the disc is formed of material in which the stretching of the material by the application of localized pressure thereto causes a change in the appearance of the disk.

26. The battery charge indicator in accordance with claim 24 in which the means adapted to apply localized pressure to the disc comprises an element of limited area disposed adjacent a side of the disc and adapted to be moved in response to the expansion of the cathode toward the disc and into contact therewith to apply localized pressure to the disc as a function of the expansion of the cathode.

27. The battery charge indicator in accordance with claim 25 in which the housing of the battery has a closed end portion which is adapted to deflect away from the interior of the housing in response to the expansion of the cathode, the disc being disposed adjacent to and overlying the closed end portion with the side of the disc opposite the portion being exposed, the deflection of the closed end portion being adapted to apply localized pressure to the disc to change the appearance of the side of the disc as a function of the discharge of the battery.

28. The battery charge indicator in accordance with claim 26 and further comprising means disposed the closed end portion of the battery adjacent for applying localized pressure to the disc in response to the expansion of the cathode against the closed end portion and the movement of the closed end portion in response thereto.

29. The battery charged indicator in accordance with claim 28 in which the means for applying localized pressure to the disc is disposed on the closed end portion of the housing continuous the overlying disc.

30. The battery charge indicator in accordance with claim 29 in which the means for applying localized pressure to the disc comprises portions of the closed end portion raised with respect to the surface thereof.

31. A battery charge indicator in accordance with claim 30 in which the portions of the closed end portion raised with respect to the surface thereof comprise ribs extending along the surface of the closed end portion.

32. A battery charge indicator in accordance with claim 26 in which the change of appearance of the disc in response to localized pressure applied thereto extends transversely with respect to the longitudinal axis of the battery, the extent of the change of appearance being a function of the state of discharge of the battery.

33. The battery charge indicator in accordance with claim 26 in which the second means defining a viewing channel includes a plate having at least one window therein for exposing the extent of the change of appearance of the disc in response to localized pressure applied thereto.

34. The battery charge indicator in accordance with claim 33 in which the plate has at least one elongated window.

35. The battery charge indicator in accordance with claim 34 in which the plate has a plurality of elongated windows disposed along a common diametrical location.

36. A battery charge indicator in accordance with claim 28 in which the disc includes a plurality of protuberances disposed on the surface thereof to which the expansion of the cathode is applied, the protuberances applying localized pressure to the portions of the disc adjacent there to cause a charge in the appearance of the disc as a function of the state of charge of the battery.

37. A battery charge indicator in accordance with claim 36 in which the plurality of protuberances are disposed in a pattern corresponding to a pattern in the change of appearance of the disc.

38. A battery charge indicator in accordance with claim 37 in which the pattern is a cruciform.

39. A battery charge indicator in accordance with claim 37 which the pattern is in a spiral form.

40. A battery charge indicator in accordance with claim 24 in which the disc includes a plurality of granules disposed on the surface thereof to which the expansion of the cathode is applied, the granules applying localized pressure in response to the expansion of the cathode to the portions of the disc adjacent there to cause a charge in the appearance of the disc as a function of the state of charge of the battery.

41. A battery charge indicator in accordance with claim 40 in which the plurality of granules are disposed across the extent of the surface of the disc to which the expansion of the cathode is applied.

42. A battery charge indicator in accordance with claim 24 in which the disc includes a plurality of raised portions disposed on the surface thereof to which the expansion of the cathode is applied, the raised portions applying localized pressure in response to the expansion of the cathode to the portions of the disc adjacent there to cause a charge in the appearance of the disc as a function of the state of charge of the battery.

43. A battery charge indicator in accordance with claim 42 in which the plurality of raised portions are ribs disposed across the extent of the surface of the disc to which the expansion of the cathode is applied.

44. The battery charge indicator in accordance with claim 24 and further comprising a colored element disposed adjacent to the disc to enhance the change in the appearance of the disc when subjected to localized pressure.

45. The battery charge indicator in accordance with claim 24 in which the disc includes coloring material to enhance the change of appearance of the disc when subjected to localized pressure to the disc as a function of the expansion of the cathode.

46. A battery charge indicator for a battery including a housing having an internally contained chemical cathode and anode for generating an electrical current when connected through one another through an external load, the cathode expanding in an amount proportional to the amount of electrical energy delivered by the battery, the battery charge indicator comprising means for defining a compressible chamber adapted to be inserted as an assembly into the battery, the compressible chamber including structure forming an elongated tube, a gel being disposed in the interior of one end portion of the tube, the opposite end portion being vented, the compression of the tube by the expansion of the cathode causing the gel to advance from adjacent the one end portion toward the opposite end portion of the elongated tube.

47. The battery charge indicator in accordance with claim 46 and further comprising means for transmitting the force resulting from the expansion of the cathode to the opposite sides of the elongated tube.

48. The battery charge indicator in accordance with claim 47 in which the means for transmitting the force to the opposite sides of the elongated tube comprises a pair of plates, each plate being disposed adjacent on different opposite sides of the elongated tube.

49. A method of indicating a state of charge of a battery having an internally contained chemical cathode capable of expanding in an amount proportional to the total current generated, the battery having a blister containing a gel, the blister being exposed to the expansion of the cathode, the method comprising the steps of expelling the gel from the blister in a proportional response to the expansion of the cathode; and confining the expelled gel to a viewing channel of a length corresponding to the expected total expansion of the cathode to provide a visual indication of the remaining amount of expected expansion of the cathode.

50. A method for indicating charge of the battery in accordance with claim 49 the battery including a viewing channel, the method including the step of venting gas from the viewing channel in response to the flow of gel thereunto.

51. A method for indicting charge of a battery in accordance with claim 50 including the step of releasing gas from the viewing channel while blocking the passage of gel therethrough.

52. A method for indicating the charge of a battery including a housing having an internally contained chemical cathode and anode for generating and electrical current when connected to one another through an external load, the cathode expanding in an amount proportional to the amount of electrical energy delivered by the battery, the battery including a disk disposed as an assembly in the battery and visible therein, the appearance of the disk changing in response to the application of localized pressure thereto, the method comprising step of applying localized pressure to the disc in response to the expansion of the cathode.

53. The method for indicating the charge of a battery in accordance with claim 52 in which the disc is formed of material in which the streching of the material by the application of localized pressure thereto causes a change in the appearance of the disk.

54. The method for indicating the charge of a battery in accordance with claim 52 in which the step of applying localized pressure to the disc comprised applying an element of limited area disposed adjacent a side of the disc in response to the expansion of the cathode toward the disc and into contact therewith thereby applying localized pressure to the disc as a function of the expansion of the cathode.

55. A battery charge indicator for a battery including a housing having an internally contained chemical cathode and anode for generating an electrical current when connected to one another an external load, the cathode expanding in an amount proportional to the amount of electrical energy delivered by the battery, the battery charge indicator comprising:
first means defining a partition adapted to extend across the interior of the housing of the battery, the partition having an opening therein communicating with the electrolyte in the interior of the housing of the battery,
second means defining a viewing channel, the channel being in communication with the opening of the partition to receive a flow of electrolyte therefrom in an amount corresponding to compression of the electrolyte in response to the expansion of the cathode.

56. The battery charge indicator in accordance with claim 55 in which the second means defining a viewing channel includes means for venting gas therefrom in response to the flow of gel thereunto.

57. The battery charge indicator in accordance with claim 55 in which the second means defining a viewing channel includes means for releasing gas while blocking the passage of electrolyte therethrough.

* * * * *